No. 737,752. Patented September 1, 1903.

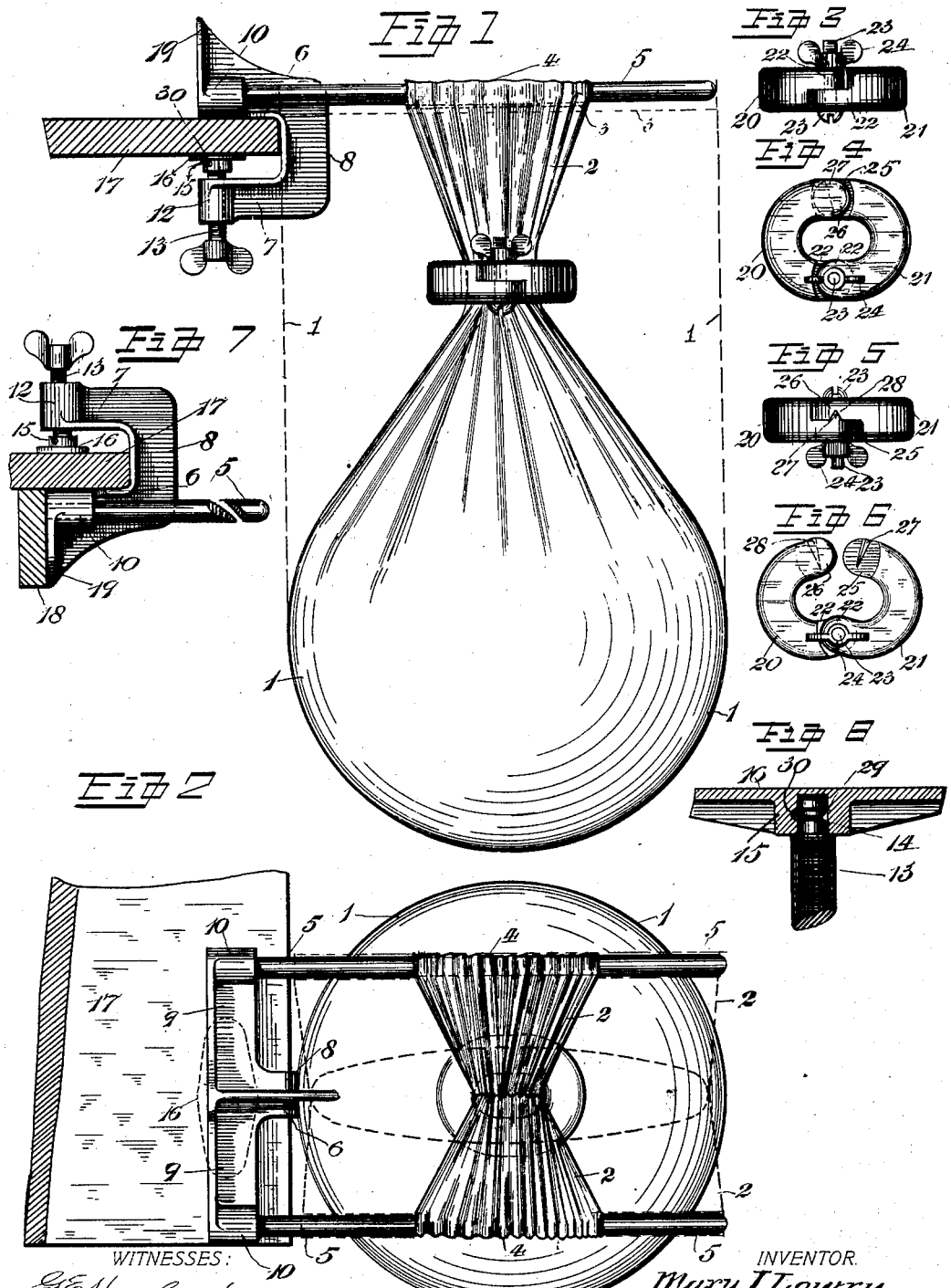

UNITED STATES PATENT OFFICE.

MARY I. LOWRY, OF INDIANAPOLIS, INDIANA.

AUTOMATIC STRAINING DEVICE.

SPECIFICATION forming part of Letters Patent No. 737,752, dated September 1, 1903.

Application filed March 2, 1903. Serial No. 145,872. (No model.)

*To all whom it may concern:*

Be it known that I, MARY I. LOWRY, a citizen of the United States, residing at Indianapolis, in the county of Marion and State of Indiana, have invented new and useful Improvements in Automatic Straining Devices, of which the following is a specification.

My invention relates to certain new and useful improvements in culinary articles; and it consists in an automatic means for expressing and separating the juice from the cooked pulp of fruit or from cooked fruit and other allied purposes, as will be hereinafter more particularly set forth, and pointed out in the claims.

The object of this invention is, first, to provide a means whereto the straining sack or bag may be removably secured and wherefrom said straining-sack may be suspended and by which means the mouth or open top end of said straining-sack is held open to readily receive the prepared ingredients or cooked materials to be strained; second, to provide a means whereby a continuous and uniform pressure is applied to the contents of said sack to express the juice from the contents thereof and to separate said juice from said ingredients or pulp and to strain the former from the latter.

I attain these objects by means of the device illustrated in the accompanying drawings, in which similar numerals of reference designate like parts throughout the several views.

Figure 1 is a side elevational view of my invention of a pulp or other fruit strainer and showing the straining-sack suspended from its supporting means and the gravity straining-ring applied to said straining-sack. Fig. 2 is a plan view of the same. Fig. 3 is a side detail view of the compressing or gravity ring and showing the hinged side thereof. Fig. 4 is a plan view of the same. Fig. 5 is a side view of said ring, showing the lapping and locking joint of the same. Fig. 6 is another plan view of said ring, showing the same opened ready to receive the tucked-in throat portion of the straining sack or bag. Fig. 7 is a detail of the clamping means for supporting the suspension-rods of the straining-sack and showing the same attached to a table or bench in a position inverted from that shown in Fig. 1, and Fig. 8 is a detail broken sectional view of the clamping-plate of the clamping and supporting device.

The sack or receptacle into which the materials or cooked ingredients are placed is composed of a suitable woven fabric, the texture of which is of the proper coarseness and mesh to suit the material or pulp to be strained, and said sack is provided with two opposing top sides or flaps 2, which are each provided at their top marginal ends with the hems 3, which are of sufficient depth or width to form the extended loops 4, which latter are adapted to receive the two opposing supporting-rods 5, from which said straining-sack 1 is suspended when the latter is in use.

The supporting or suspension rods 5 are preferably held and secured in horizontal position and in parallel relation, and said rods are situated at a suitable distance apart to secure a proper spread or separation of said laps 2, and thereby insure and maintain the top open portion of said straining-sack open ready to receive the prepared or cooked material or pulp.

The supporting or suspension rods 5 are secured at their ends only to a suitable clamping means or screw-clamp to be secured or clamped to a table, bench, or other piece of furniture, and any suitable form of securing-clamp may be constructed, such as that illustrated in the drawings, and which clamp is composed of the jaws 6 and 7, formed integral with the throat-piece 8.

Integral on the jaw 6 are formed the arms 9, which extend from each side of said jaw 6, and on the ends of said arms are formed the bosses 10, which are drilled to receive the ends of said suspension or supporting rods 5 and wherein the latter are firmly secured in any suitable manner and by any suitable securing means. A boss 12 is formed integral on the end of the jaw 7, and the same is threaded to receive the thumb binding-screw 13, and the end of the said screw 13 has its pivotal end 14 reduced to freely fit and to turn in the bore of the boss 15, formed integral on the clamping-plate 16. The pivotal clamping-plate 16 is moved nearer to or farther from its opposing clamping-jaw 6 by means of said clamping-screw 13, so that when applying said supporting or clamping means to the leaf 17 of a bench or table all that is necessary to be done is to apply said supporting or clamping means to a table-leaf 17 so that the jaw 6 will bear on the top surface of said leaf, as shown in Fig. 1, and will project sufficiently far over the edge of said leaf or said leaf will extend to the end of the gap formed between the jaws 6 and 7 to contact with the throat-piece 8, which position of said clamping means secures the stability of said supporting or clamping means, and after so placing said clamping or supporting means the said thumb-screw 13 is turned to cause the pivotal clamping-plate 16 to firmly bind or bear against the under side of said leaf 17 to securely retain said supporting or clamping means in position. The said clamping means may be also secured to the leaf 17 of a table or bench with its thumb-screw situated above the table, as illustrated in Fig. 7, which position is preferable in most cases, and particularly in such cases as where a reinforcing brace or batten 18 is secured to the under side of the leaf of the table and situated near the edge thereof, so that said batten may be utilized as a means against which the central portion or foot 19 of said clamping or supporting means may abut to reinforce and insure a more secure and stable support.

The main feature of my invention I will now proceed to describe, and the same consists in a compressing means or gravity-ring by means of which the material contained in the straining-sack is automatically compressed. The compressing or gravity ring is preferably of an oblong form having rounded ends or corners, or it may be elliptical in form, and massive in construction relatively to its size and must be of a sufficient weight to compress the contents of the straining-sack, which operation will be hereinafter described, and said compressing-ring is composed of the opposing sections, parts, or halves 20 and 21, which are hinged the one to the other by the lap-hinges 22, which are held in close contact by means of the hinge binding-screw 23 and its thumb-nut 24, and said laps 22 are constructed each equal to one-half of the thickness of the section of said compressing or gravity ring to secure a uniform thickness of the latter. The opposite lapping ends 25 and 26 of said sections (see particularly Fig. 4) are also each one-half the thickness of the section of said ring and are thus constructed for the same reason as in the case of the clamping or hinge joint, and the inner bearing-face of one of the said laps, as 25, is provided with a locking-lip 27, which extends across the face of said lap in a direction transverse to the longer axis of said compressing or gravity ring, and said lip 27 is adapted to engage or fit into an opposing similarly-formed groove or recess 28, formed in the bearing-face of the lap 26, so that when the lap 26 is placed over the lap 25 the locking-lip 27 will enter and engage the notch 28 to lock the sections of the said rings together, and when said binding thumb-nut 24 is tightly screwed on the hinge binding-screw 23 to cause the laps 25 and 26 to bind or to be tightly clamped together the opposing sections, constituting the said compressing or gravity ring, are firmly locked together.

The reduced pivotal portion 14 of the binding-screw 13 is provided with a locking-groove 29, and a hole is drilled in the side of the boss 15 of the clamping-plate 16, into which is driven the retaining-pin 30, which latter is engaged by the said groove 29 to retain said binding or clamping plate in said pivotal end of said screw 13.

The operation of my device I will now proceed to describe. I first secure the supporting or clamping means of the suspending-rods 5 to the leaf 17 of a bench or table, as illustrated in Figs. 1 and 2 or as shown in Fig. 7. I next apply the looped ends 4 of the laps 2 to the ends of the said rods 5 and push said loops over on the suspension-rods 5 till the straining-sack assumes a position and form similar to that shown in dotted lines in Figs. 1 and 2, and the laps 2 being separated and held apart by the suspension-rods 5, as shown particularly in Fig. 2, and the top of said straining-sack is maintained open ready for the entrance of the material or ingredients to be compressed or filtered. The straining-sack being charged with the ingredients, material, or pulp to be compressed, as shown in full lines in Figs. 1 and 2, the hinged sections of the compressing or gravity ring are opened, as shown particularly in Fig. 6, and the said ring is applied to said straining-sack at or near the open mouth thereof, as shown in Fig. 1, in which the said throat of said sack 1 is gathered in folds and tucked in between said ring-sections 20 and 21 of said compressing or gravity ring, after which said sections are closed to surround the tucked portion of said straining-sack, and the binding-screw nut 24 is screwed on its binding-screw 23 to firmly bind and to lock said opposing ring-sections 20 and 21 of said ring together. The said compressing or gravity ring is now permitted to descend by its own gravity to compress or separate the juice from the material contained in said straining-sack, and said gravity-ring is permitted to thus remain until practically all the juice has been expressed.

Having thus fully described this my invention, what I desire to cover by Letters Patent of the United States therefor is—

1. In an automatic straining device, the combination with a sack-suspending means and a straining-sack, of a compressing or gravity ring surrounding the tucked-in portion of the neck of said straining-sack and situated intermediate the mouth and the lower portion of the sack.

2. In an automatic straining device, the combination with a sack-suspending means and a straining-sack, of a compressing-ring composed of two opposing sections connected together.

3. In an automatic straining device, the combination with a sack-suspending means and a straining-sack, of a compressing or gravity ring composed of two opposing interlocking sections adapted to inclose the neck of said straining-sack.

4. In an automatic straining device, the combination with a sack-suspending means and a straining or filtering sack or screen, of a compressing or gravity ring, said ring divided into opposed hinged interlocking sections and means for locking said sections in their closed positions.

5. In an automatic straining device, the combination with a suspended straining-sack or filter, of a compressing or gravity ring, said ring divided into opposed hinged interlocking sections, the ends of which sections are halved to lap, the bearing-face of one of which is provided with a locking-lip and that of the opposite section with an opposing recess or depression and means for securely locking said sections to form a closed ring.

6. The combination with a straining-sack having its top open, and provided with two opposing flaps or top sides, suspension-loops on the top edges of said flaps and a gravity-ring, of a pair of horizontally-extending parallel suspension-rods and suitable suspension-rod-supporting means.

7. The combination with a straining-sack having its top open and provided with two opposing flaps or top sides, suspension-loops on the top edges of said flaps and a gravity-ring, of a pair of horizontally-extending parallel suspension-rods, a supporting-clamp and arms on said clamp whereto said rods are secured to be supported.

In testimony whereof I have hereunto set my hand in the presence of two subscribing witnesses.

MARY I. LOWRY.

Witnesses:
   THOMPSON R. BELL,
   G. E. HOAGLAND.